(12) United States Patent  (10) Patent No.: US 8,633,606 B2
Anzioso et al. (45) Date of Patent: Jan. 21, 2014

(54) ASSEMBLY FOR GENERATING ELECTRICAL AND THERMAL ENERGY

(75) Inventors: Franco Anzioso, Orbassano (IT); Giovanni Barba, Orbassano (IT)

(73) Assignee: C.R.F. Societa Consortile per Azioni (IT)

( * ) Notice: Subject to any disclaimer, the term of this patent is extended or adjusted under 35 U.S.C. 154(b) by 65 days.

(21) Appl. No.: 13/119,855

(22) PCT Filed: Sep. 17, 2009

(86) PCT No.: PCT/EP2009/062058
§ 371 (c)(1),
(2), (4) Date: Aug. 17, 2011

(87) PCT Pub. No.: WO2010/031815
PCT Pub. Date: Mar. 25, 2010

(65) Prior Publication Data
US 2011/0291410 A1 Dec. 1, 2011

(30) Foreign Application Priority Data

Sep. 19, 2008 (EP) .................................. 08425614

(51) Int. Cl.
*H02K 7/18* (2006.01)
(52) U.S. Cl.
USPC .......................................................... 290/2
(58) Field of Classification Search
USPC .......................................................... 290/2
See application file for complete search history.

(56) References Cited

U.S. PATENT DOCUMENTS

| 4,752,697 A | 6/1988 | Lyons et al. |
| 5,617,504 A | 4/1997 | Sciacca et al. |
| 6,053,418 A * | 4/2000 | Guyer .......................... 237/12.1 |
| 7,466,034 B2 * | 12/2008 | Kang et al. ................... 290/40 C |
| 2005/0146223 A1 * | 7/2005 | Kanouda et al. ................ 307/66 |

FOREIGN PATENT DOCUMENTS

| DE | 9210132 | 9/1992 |
| EP | 0936178 | 8/1999 |
| EP | 1693625 | 8/2006 |
| EP | 1864845 | 12/2007 |
| EP | 1881177 | 1/2008 |
| EP | 1959537 | 8/2008 |

* cited by examiner

*Primary Examiner* — Tulsidas C Patel
*Assistant Examiner* — Sean Gugger
(74) *Attorney, Agent, or Firm* — The Belles Group, P.C.

(57) ABSTRACT

An assembly for generating electrical and thermal energy has a structure that supports a cogeneration device provided with a combustion engine supplied with fuel, an electric generator driven by the combustion engine, and at least one heat exchanger to heat a fluid for a thermal appliance using the heat produced by the combustion engine; the assembly also has a plurality of storage batteries, which guarantee the continuity of the flow of electrical energy during start-up of the electric generator and during load transients and are housed in a base of the structure.

18 Claims, 4 Drawing Sheets

ASSEMBLY FOR GENERATING ELECTRICAL AND THERMAL ENERGY

TECHNICAL FIELD

The present invention relates to an assembly for generating electrical and thermal energy, generally referred to as a cogeneration assembly, or a trigeneration assembly if the thermal energy can be produced in two usable forms, namely high-temperature energy which can be used for example for heating and/or for services, and low-temperature energy which can be used for example for air-conditioning rooms and/or services.

BACKGROUND ART

EP1881177 describes a modular power generation assembly comprising a main cogeneration module, which can be supplied with fuel and is able to generate electrical energy for user appliances, connected in parallel to an external electrical power network or operating in isolation.

The main module also generates thermal energy in the form of a flow of hot water. The thermal energy produced by the main module can supply an auxiliary module able to supply thermal energy at a lower temperature, in the form of a flow of a chilled fluid.

The main module comprises: an electrical energy generation assembly, consisting of an internal combustion engine coupled to an alternating-current rotary electric generator; a heat exchanger coupled to the internal combustion engine; and an electronic converter unit which, in turn, comprises:
  an ac/dc converter connected to the output of the electric generator;
  a dc/ac converter connected, on one side, to the electrical output terminal of the main module via a filter and, on the other side, to the output of the ac/dc converter via a dc link, and
  an electrical energy storage module coupled to the dc link via a bi-directional dc/dc converter, which allows a flow of electrical energy from the storage module to the dc link and vice versa.

The main module and auxiliary module are managed according to predefined procedures by a control unit. Said control unit is able to detect an interruption in the service of the external electrical power network, and ensure the continuity of electrical power supply to the user appliances, with electrical energy supplied by the storage module for long enough to start the electrical energy generation assembly.

Moreover, the control unit is preset to implement a function involving elimination or "smoothing" of the voltage "drops" by means of continual analysis of the value of the output voltage and drawing, as required, power from the electrical energy storage module, which is used as a buffer.

In other words, the electrical energy storage module ensures the continuity of the power supply during start-up of the electrical energy generation assembly and during the inevitable load transients.

In practice, the electrical energy storage module is defined by storage batteries that are arranged in separate rooms some distance from the other components of the electronic converter and are connected to said components by means of high voltage cables (approx. 600 V).

This solution is not satisfactory, with regard to overall dimensions and ease of maintenance, due to the distance between the batteries and the other components of the main module, and with regard to safety, due to the presence of high-voltage cables around said main module.

DISCLOSURE OF INVENTION

The purpose of the present invention is to provide an assembly for generating electrical and thermal energy, which overcomes the drawbacks described above in a simple and cost-effective manner.

According to the present invention there is provided an assembly for generating electrical and thermal energy, comprising:
  a supporting structure;
  a cogeneration device carried by said supporting structure and comprising:
    a) a combustion engine supplied with fuel;
    b) an electric generator driven by said combustion engine;
    c) at least one heat exchanger to heat a fluid for a thermal appliance using the heat produced by said combustion engine;
  electrical energy storage means to guarantee the continuity of the electrical power supply during start-up of said electric generator and during load transients;
characterized in that said electrical energy storage means are housed in said supporting structure.

Preferably, said electrical energy storage means are housed in a base of said supporting structure.

BRIEF DESCRIPTION OF THE DRAWINGS

In order to better understand the present invention, a non-limiting preferred embodiment thereof will now be described by way of example with reference to the accompanying drawings, in which.

BEST MODE FOR CARRYING OUT THE INVENTION

Figure 1:
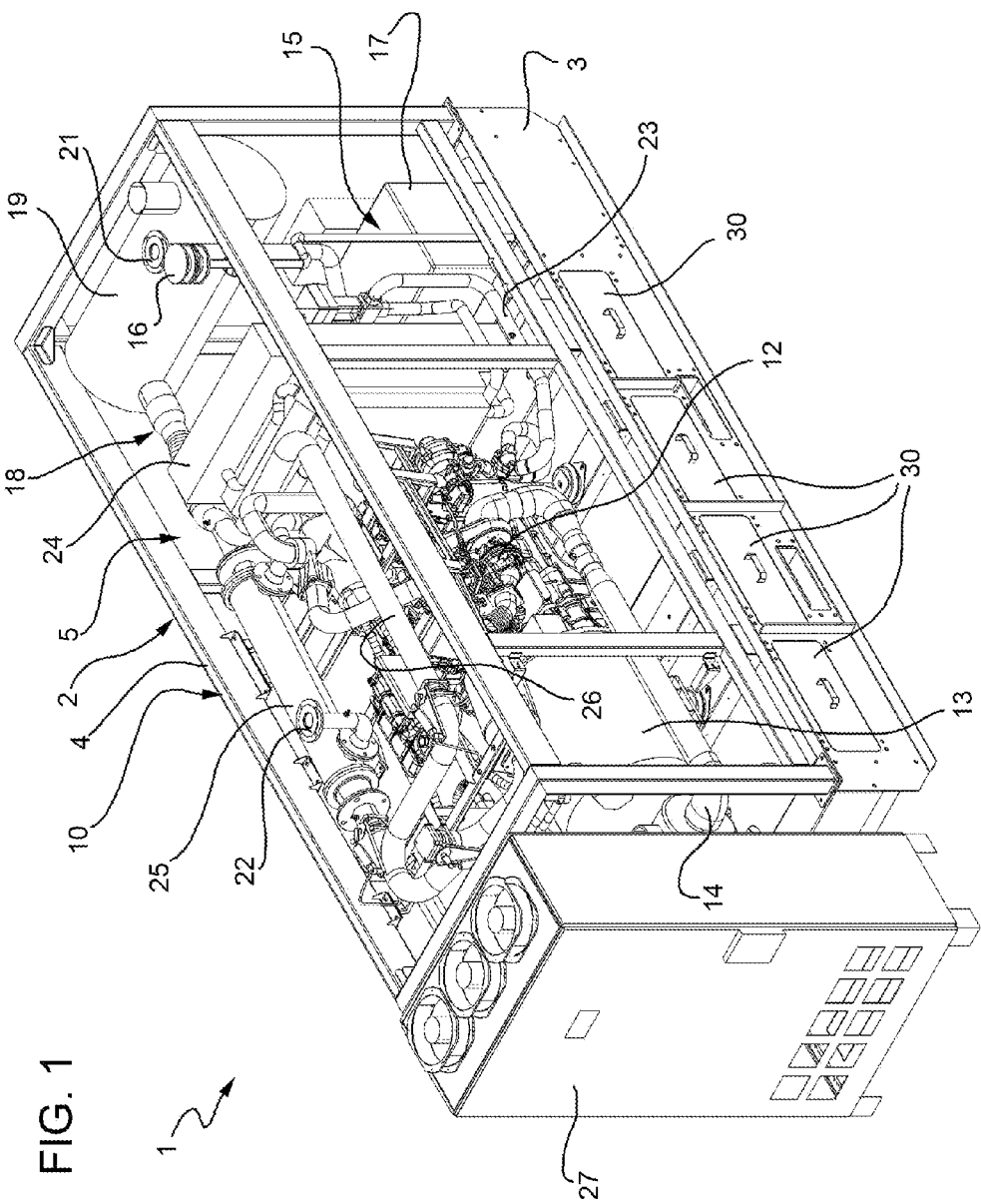
FIG. 1 is a partial perspective view of a preferred embodiment of the assembly for generating electrical and thermal energy according to the present invention.

In FIG. 1 designated as a whole by number 1 is an assembly for generating electrical and thermal energy, the latter in the form of flows of hot fluids (for example water or air), for example to heat thermal appliances, or cold, for air-conditioning of said appliances.

As regards the electrical energy, the assembly 1 has a first electrical output terminal (not illustrated) which can be connected directly to electrical appliances and a second electrical output terminal (not illustrated), which can be connected to an external electrical power network.

The assembly 1 comprises a supporting structure 2, which in turn comprises a base 3 resting on the floor and a frame 4 defining a compartment 5 having a substantially parallelepiped shape on top of the base 3.

The assembly 1 comprises a cogeneration device 10, which is supplied with fuel, for example natural gas and has components of its own housed in the compartment 5 and supported by the frame 4.

The device 10 comprises an internal combustion engine 12 coupled to an alternating-current rotary electric generator 13. The engine 12 receives the combustion air from an intake line 14 and the gaseous fuel from a delivery line 15, which has an inlet 16 that can be connected to an external distribution network and is provided with a compressor 17. The fumes generated by the engine 12 are discharged through an exhaust line 18 that terminates in a stack 19. The engine 12 is also provided with a liquid cooling system.

The device 10 also comprises at least one heat exchanger to heat a flow of fluid, in particular water, for thermal appliances using the heat generated by the combustion engine 12. Numbers 21 and 22 indicate, respectively, the inlet and the outlet of a duct 23 that carries the water to be heated for the thermal appliance. In particular, arranged along the duct 23 there are: a heat exchanger 24 defined by a radiator coupled to the cooling system of the engine 12; and a heat exchanger 25 coupled to a portion of the line 18, in parallel to a bypass portion 26 for the exhaust fumes, to draw heat from the exhaust fumes.

The assembly 1 also comprises an electronic converter (not illustrated), which converts the electrical energy produced by the generator 13, is housed in a cabinet 27 arranged at the side of the structure 2, and comprises:

- an ac/dc converter connected to the output of the generator 13;
- a dc/ac converter connected, on one side, to an electrical output terminal (not illustrated) via a filter and, on the other side, to the output of the ac/dc converter via a dc link, and
- a bi-directional dc/dc converter to connect the dc link to a plurality of electrical energy storage modules 28 (FIGS. 2-4) and allow a flow of electrical energy from the modules 28 to the dc link and vice versa.

An electronic unit (not illustrated) is arranged in the cabinet 27 or in a remote position to control the device 10 and manage the thermal power and electrical power output.

According to the invention, the modules 28 are storage batteries housed in the structure 2, in particular in the base 3.

Figure 2:
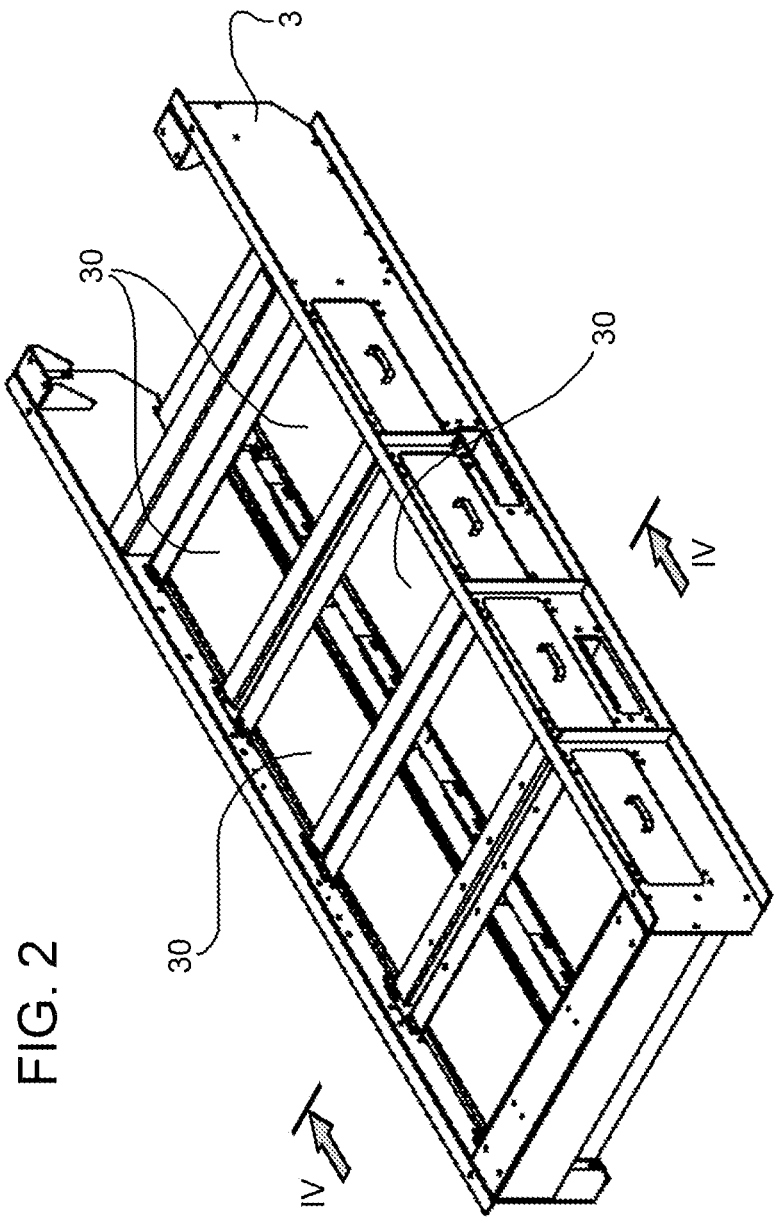
FIG. 2 illustrates a detail of FIG. 1.
Figure 3:
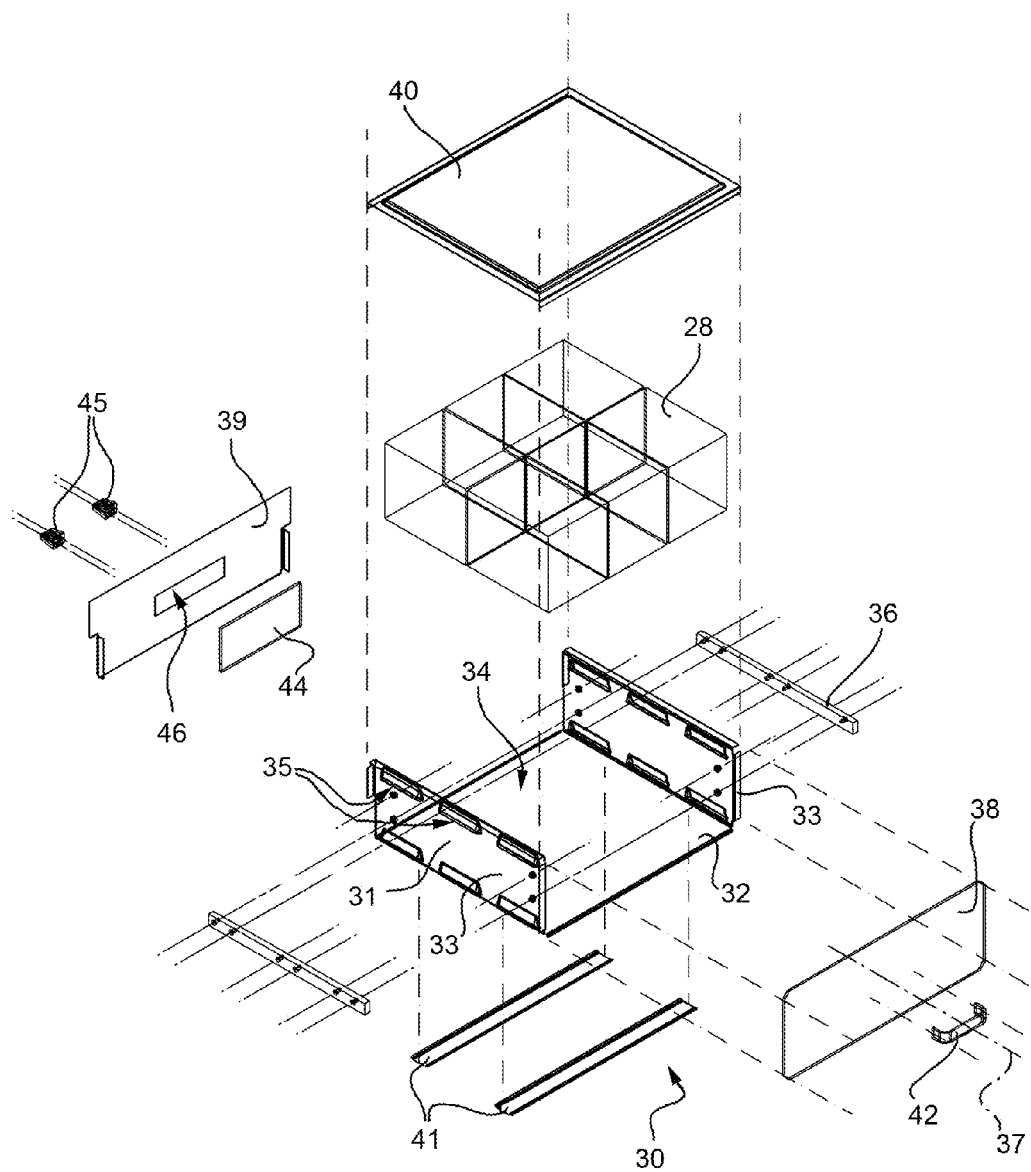
FIG. 3 is an exploded view on an enlarged scale of a battery-holder drawer belonging to the assembly according to the present invention.

With reference to FIGS. 2 and 3, the batteries 28 are housed in drawers 30 arranged along two rows, which are accessible from opposite sides of the structure 2. Each drawer 30 comprises a U-shaped receptacle 31 comprising a horizontal base wall and two side walls 33 defining a seat 34 engaged by the batteries 28. The walls 33 are provided with aeration apertures 35 and are coupled to the base 3 via guideways 36, that allow the drawer 30 to slide along a horizontal axis 37 to be extracted at least partially from the base 3.

The seat 34 is closed at the front and rear by respective vertical walls 38, 39, which are fixed to the receptacle 31. The seat 34 is closed at the top by a cover 40, which is removable to access the seat 34 from above when the drawer 30 has been extracted.

The lower surface of the wall 32 is reinforced by two bars 41, which are arranged transversely to the axis 37; the wall 38 carries, in a fixed position, an external handle 42 for moving the drawer 30 manually; and the wall 39 carries a vertical plate 44, which is arranged in a fixed position at the bottom of the seat and supports two electrical connectors 45, which define a positive pole and, respectively, a negative pole. The batteries 28 of each drawer 30 are connected electrically in series to one another and are connected to the electrical connectors 45 in a manner that is not illustrated and not described in detail.

Figure 4:
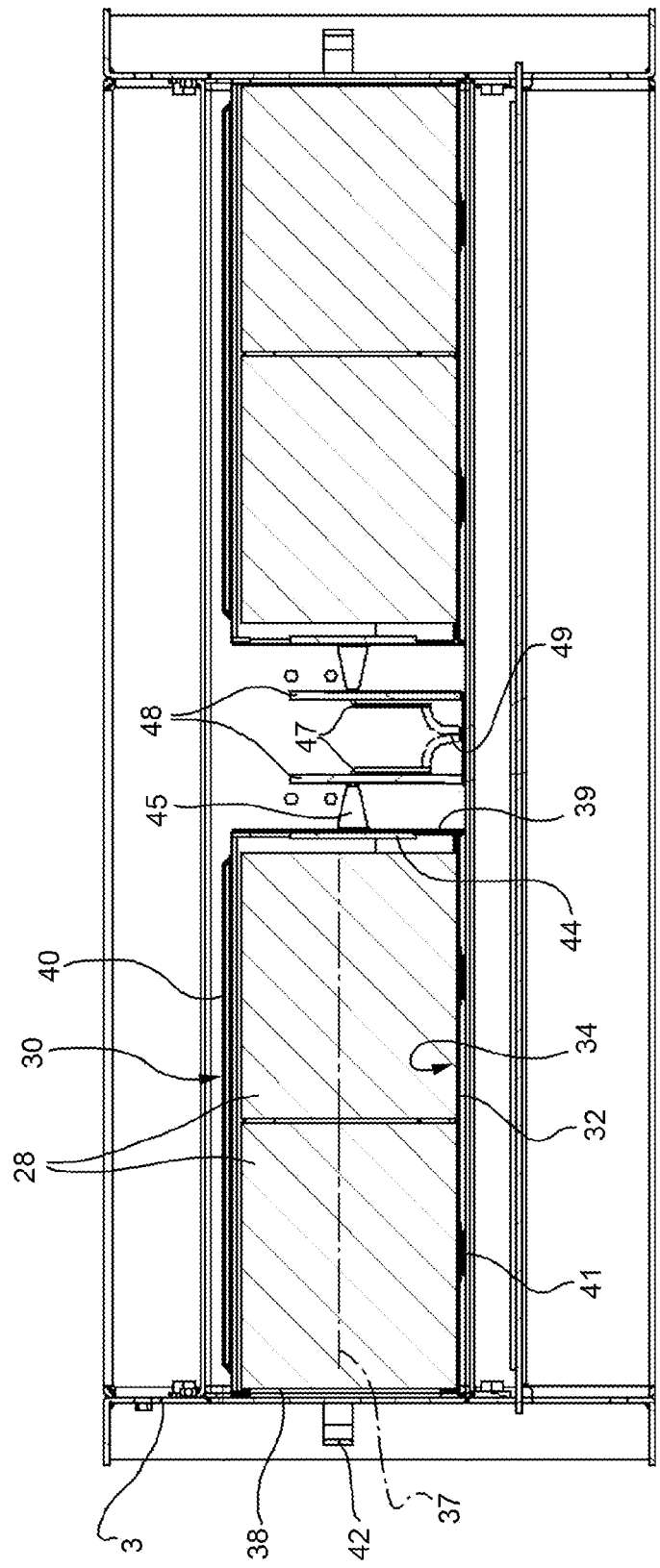
FIG. 4 is a cross-sectional view, on an enlarged scale, along the line IV-IV of FIG. 2.

With reference to FIG. 4, the electrical connectors 45 extend in a cantilevered manner from the plate 44 through an aperture 46 in the wall 39 outside the seat 34. When the drawer 30 is fully retracted inside the base 3, the electrical connectors 45 are connected to respective electrical contacts 47 provided on a vertical plate 48 made of an insulating material and arranged in a fixed position inside the base 3. The electrical contacts 47 are, in turn, electrically connected to cables 49 that carry the electrical energy, in a manner that is not illustrated and not described in detail, towards the side of the structure 2 where the cabinet 27 is arranged, to enable the electrical connection between the batteries 28 of the various drawers 30 to the electronic converter arranged in the cabinet 27.

When the drawers 30 are extracted, to carry out maintenance on the assembly 1 or to replace the batteries 28, the electrical connectors 45 move away from the electrical contacts 47 so that the electrical connection is automatically disconnected.

According to an alternative embodiment that is not illustrated, instead of an electrical connection that is automatically disconnected, cables are provided between the drawers 30 and the plates 48 and are supported and guided by flexible tracks, with the possibility of disconnecting the electrical connection of said cables manually.

The position of the batteries 28 in the base 3 allows the overall dimensions available to be optimized without having high-voltage cables exposed around the structure 2.

The sliding connection between the drawers 30 and base 3 is extremely simple to implement and makes maintenance and replacing the batteries 28 extremely convenient. The drawers 30 can even be extracted completely from the base 3 and carried elsewhere without any trouble.

Lastly, it is clear that modifications and variations may be made to the assembly 1 described and illustrated herein without departing from the scope of the present invention, as set forth in the appended claims.

In particular, the batteries 28 could be arranged in a part of the structure 2 other than in the base 3.

The invention claimed is:

1. An assembly for generating electrical and thermal energy, comprising:
   a supporting structure;
   a cogeneration device carried by said supporting structure and comprising:
   (a) a combustion engine supplied with fuel;
   (b) an electric generator driven by said combustion engine; and
   (c) at least one heat exchanger to heat a fluid for a thermal appliance using heat produced by said combustion engine;
   storage batteries to maintain continuity of an electrical power supply during start-up of said electric generator and during load transients;
   wherein said supporting structure comprises a base resting on a floor, and a compartment on top of said base;
   wherein said cogeneration device is housed in said compartment; and
   wherein when said storage batteries are housed in said base, electrical connectors that are electrically coupled to said storage batteries automatically come into surface contact with electrical contacts positioned within said base to form an electrical connection between said storage batteries and said electrical contacts.

2. The assembly according to claim 1, further comprising:
   an electronic converter;
   a cabinet housing said electronic converter and arranged at a side of said supporting structure; and
   wherein said electrical contacts are arranged in a fixed position inside said base and connected to cables that carry electrical energy from said storage batteries towards said side to form an electrical connection between said storage batteries and said electronic converter.

3. The assembly according to claim 1, wherein said electrical contacts are provided on a vertical plate arranged in a fixed position inside said base and wherein said electrical connectors extend from said storage batteries in a cantilevered manner.

4. The assembly according to claim 1, wherein said storage batteries are arranged in a plurality of drawers that are removably housed within the base.

5. The assembly according to claim 4, wherein the electrical connection between said storage batteries and said electrical contacts is automatically disconnected when the drawers are removed from the base.

6. The assembly according to claim 1, wherein when said storage batteries are housed in said base rear surfaces of said storage batteries are located entirely within said base in an unexposed manner.

7. The assembly according to claim 1 wherein a first row of drawers is housed within said base on a first side of said base and a second row of drawers is housed within said base on a second side of said base, said second side of said base being opposite said first side of said base, each drawer of said first and second rows of drawers housing at least one of the storage batteries.

8. The assembly according to claim 7 wherein a first drawer of the first row of drawers houses a first storage battery and has a first electrical connector electrically coupled to the first storage battery, and wherein a first drawer of the second row of drawers houses a second storage battery and has a second electrical connector electrically coupled to the second storage battery, the first and second electrical connectors positioned in facing relation within the base and separated by a gap.

9. The assembly according to claim 8 further comprising a first vertical plate arranged in a fixed position within said base and a second vertical plate arranged in a fixed position within said base, each of the first and second vertical plates having one or more of said electrical contacts positioned thereon, and wherein said first electrical connector is in surface contact with said electrical contact of said first vertical plate when said first drawer of said first row of drawers is fully housed in said base and said second electrical connector is in surface contact with said electrical contact of said second vertical plate when said first drawer of said second row of drawers is fully housed in said base.

10. An assembly for generating electrical and thermal energy, comprising:
    a supporting structure comprising a base resting on a floor and a compartment on top of said base;
    a cogeneration device housed in said compartment and comprising:
        a combustion engine supplied with fuel;
        an electric, generator driven by said combustion engine; and
        at least one heat exchanger to heat a fluid for a thermal appliance using the heat produced by said combustion engine;
    electrical energy storage means housed in said base to maintain continuity of an electrical power supply during, start-up of said electric, generator and during load transients, wherein the electrical energy storage means comprises a plurality of storage batteries; and
    a plurality of drawers that are slidably insertable into the base, each of the storage batteries being housed in one of the drawers, each of the drawers having a rear wall that supports electrical connectors, wherein the storage batteries are electrically coupled to the electrical connectors.

11. The assembly of claim 10 further comprising a plurality of vertical plates located within the base, each of the plurality of vertical plates having electrical contacts thereon, and wherein when the drawers are slidably inserted into the base, the electrical connectors of each of the drawers is in surface contact with the electrical contacts of one of the vertical plates.

12. The assembly of claim 10 wherein a first drawer of the plurality of drawers is positioned on a first side of the base and a second drawer of the plurality of drawers is positioned on a second opposite side of the base so that the rear wall of the first drawer is in facing relation to the rear wall of the second drawer.

13. The assembly of claim 12 wherein a first vertical plate having electrical contacts and a second vertical plate having electrical contacts are positioned within the base between the rear wall of the first drawer and the rear wall of the second drawer.

14. The assembly of claim 13 wherein the electrical connectors of the first drawer are in surface contact with the electrical contacts of the first vertical plate and the electrical connectors of the second drawer are in surface contact with the electrical contacts of the second vertical plate.

15. The assembly of claim 14 wherein the electrical contacts of the first and second vertical plates are electrically connected to cables that carry electrical energy from the storage batteries to an electronic converter.

16. An assembly for generating electrical and thermal energy, comprising:
    a supporting structure comprising a base resting on a floor and a compartment on top of said base, the base having at least one passageway extending from a first opening in a first side of the base to a second opening in a second opposite side of the base;
    a cogeneration device housed in said compartment and comprising:
        a combustion engine supplied with fuel;
        an electric generator driven by said combustion engine; and
        at least one heat exchanger to heat a fluid for a thermal appliance using the heat produced by said combustion engine;
    first and second plates having electrical contacts positioned within the passageway of the base in a spaced apart manner; and
    a first drawer housing a first storage battery slidably inserted into the passageway through the first opening so that electrical connectors extending from the first drawer are in surface contact with the electrical contacts of the first plate and a second drawer housing a second storage battery slidably inserted into the passageway through the second opening so that electrical connectors extending from the second drawer are in surface contact with the electrical contacts of the second plate.

17. The assembly of claim 16 wherein the electrical connectors extending from the first drawer are electrically coupled to the first storage battery and wherein the electrical connectors extending from the second drawer are electrically coupled to the second storage battery.

18. The assembly of claim 17 wherein the electrical contacts of the first and second vertical plates are electrically connected to cables that carry electrical energy from the first and second storage batteries to an electronic converter.

* * * * *